Oct. 5, 1954   R. M. DANIEL   2,690,955
CONTACTING SOLIDS AND GASES
Filed March 31, 1951
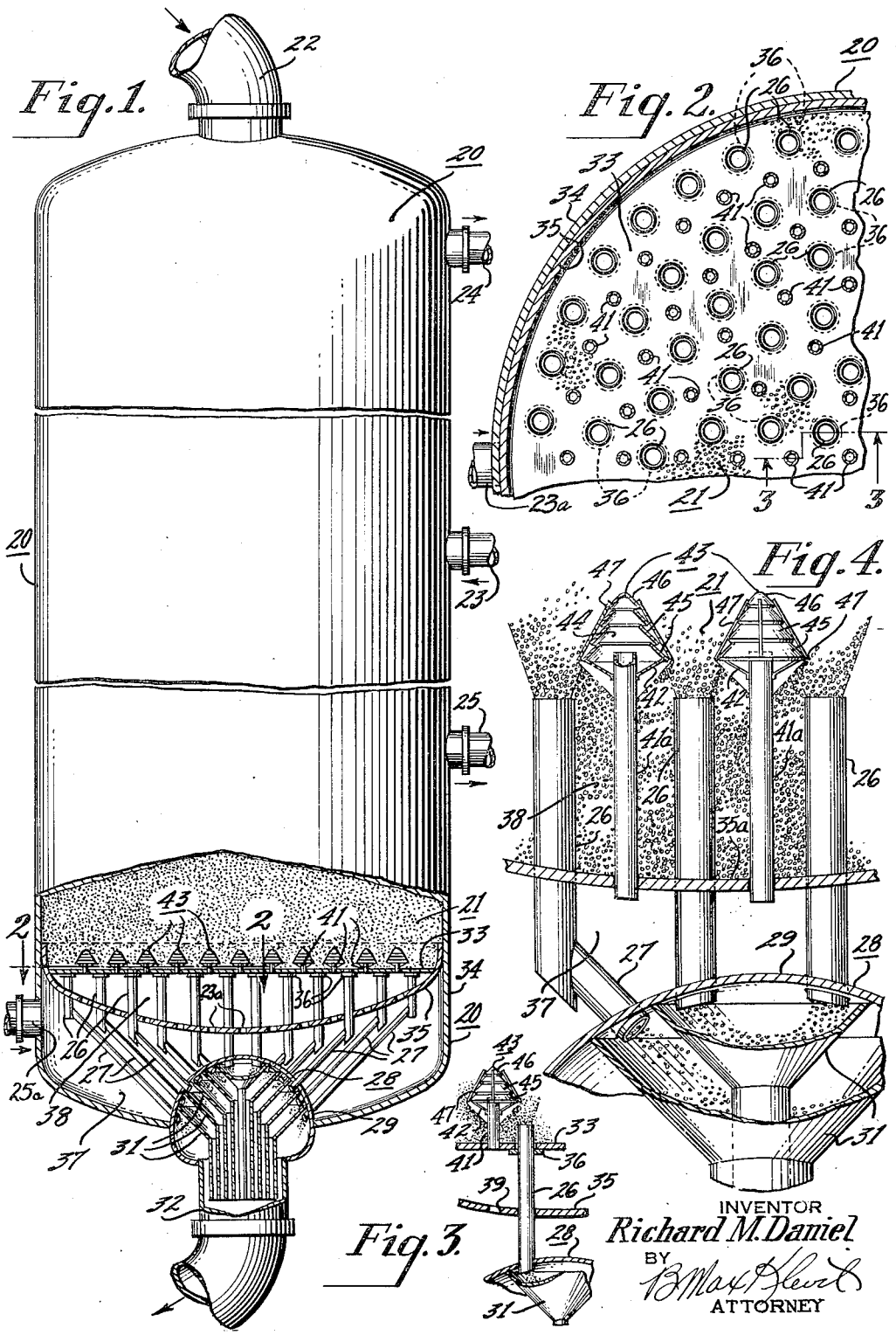
INVENTOR
Richard M. Daniel
BY
ATTORNEY Patented Oct. 5, 1954

2,690,955

UNITED STATES PATENT OFFICE 2,690,955

CONTACTING SOLIDS AND GASES

Richard M. Daniel, Springfield, Pa., assignor to Houdry Process Corporation, Wilmington, Del., a corporation of Delaware Application March 31, 1951, Serial No. 218,623

5 Claims. (Cl. 23—1)

The present invention relates to contacting of solids and gases and is particularly concerned with improved operations and arrangements for passing gases and vapors through gravitating beds of solid contact materials. An important application of the invention is in connection with hydrocarbon conversion systems of the compact moving bed type.

The use of moving bodies or beds of solid particles or granules in processes that involve the contact of masses of such solid particles with fluids, as for example, catalytic conversions of organic vapors by solid catalyts, has resulted in considerable advantages due to the continuous nature of the process but has also been attended by operating difficulties occasioned by limitations inherent in the manner in which solid particles flow. Various disadvantages in presently used processes involving the engagement and subsequent countercurrent flow of gas through a downwardly moving bed of fluent solid particles in a contact zone may be overcome using methods and apparatus embodying the present invention, as discussed more fully below.

The general technique for use of downwardly moving compact non-turbulent beds of fluent solid particles as contact masses is adequately set forth in the technical literature and hence does not need to be reviewed here. (See, for the application of this technique to the catalytic cracking of hydrocarbons, an article entitled "The 'TCC' Cracking Process for Motor Gasoline Production" by R. H. Newton, G. S. Dunham, and T. P. Simpson, "Transactions of the American Institute of Chemical Engineers," volume 41, page 215, April 25, 1945, and the articles there cited; and for its application to the use of fluent inert particles for pyrolytic conversions, an article entitled "Thermofor Pyrolytic Cracking" by S. C. Eastwood and A. E. Potas, "Petroleum Processing," volume 3, page 837, Sept. 1948.) Although the present invention is useful in connection with a wide variety of processes, it will, for convenience and brevity, be described in terms of hydrocarbon conversion processes, particularly cracking; those skilled in the art will be able to apply the process and apparatus set forth herein to other fields and uses.

As noted above, the flow of granular solids in bed form has inherent properties or characteristics that operate as limitations on the use of such solids as contact masses. One of these properties associated with the present invention, is that, when such solids flow or discharge through an opening at the bottom of a vessel containing a bed of such solids, there is flow or movement substantially only in an inverted frustoconical zone extending into the bed above the opening, the bottom of the frusto-conical zone being coextensive with the opening and the outwardly tapering sides of the zone being inclined to the horizontal at the angle of flow (generally of the order of about 70°). The granular solids outside of this zone are static, or, at best, slowly moving and hence the downward movement of the bed, in regions where the frusto-conical zone does not extend to the sides, is not uniform. Consequently, uniformity of downward flow over the entire horizontal cross-sectional area of the bed is achieved by discharging the solids at a considerable plurality of locations or points regularly arranged over the horizontal cross-sectional area of the bottom of the bed. Under these conditions, there are many inverted frusto-conical zones of flow; these intersect each other a short distance above the points of discharge, and uniform flow accordingly results. Various devices for achieving uniform flow under such conditions, as well as a more detailed discussion of the problem, are set forth in U. S. Patent No. 2,412,135 to L. P. Evans, issued December 3, 1946. The use of granular solid withdrawal devices of the type referred to, or their equivalent, is therefore standard practice in withdrawing a stream of granular solids from a vessel containing a bed of considerably greater horizontal cross-sectional area than that of the stream withdrawn.

When it is desired to flow gas countercurrent to the downwardly moving bed of granular solids, it has been conventional practice to introduce such gas into the bed through one or more gas distributing devices of a type shaped to baffle the flow of granular solids and to form solids-free spaces or engaging surfaces for contacting the granular solids with gas. When the engaging surfaces are disposed uniformly over the horizontal cross-sectional area of the bed, the introduction and upward flow of the gas is effected uniformly. Characteristic of such gas distributing devices is a central beam communicating with spaced parallel inverted channels positioned normally to the beam and lying in a common horizontal plane. (See U. S. patent to L. F. Strader, No. 2,480,887, issued September 6, 1949.)

In certain known installations, such a gas distributing device is placed in the bottom of the bed above the solids withdrawal device. Since required access to these two devices can be provided only by spacing them a minimum distance, such as 2 to 4 feet apart, there is necessarily a portion of the bed through which gas does not pass and hence, in a sense, constitutes a waste of uesful volume. Another limitation encountered in practical operation is that the rate of flow of the gas, as it passes upwardly in the restricted area of the bed of solids surrounding the gas distributing device, should not exceed velocities that cause turbulence or lifting of the granular solids with consequent prevention or disruption of the downward flow of the solids.

The present invention provides apparatus in which the operations of (a) withdrawing granular solids from a bed of such solids in a contacting zone in such a manner that the bed flows uniformly downward and of (b) introducing gas to the bottom of the bed for upward flow therethrough are effected simultaneously and substantially within the same space. Under such conditions, the vessel employed is simpler in its internal construction and shorter in height by as much as five feet when compared to vessels previously used. Certain other advantages of this method of operation are set forth in greater detail in the copending application of David B. Ardern, Serial No. 218,660, filed of even date herewith.

In accordance with the present invention, a vessel of the type herein described is provided with a laterally disposed partition horizontally coextensive with the cross-sectional area of the interior of the vessel and spaced above the bottom of said vessel so as to define a gas manifold chamber separated from and out of direct contact with a bed of granular solids thereabove. Granular solids are removed from this bed through a plurality of open-topped conduits extending upwardly through the partition and terminating at a solids withdrawal level or zone above the partition, at which level or zone said conduits communicate with the space occupied by the bed of solids thereabove. These open-topped conduits pass through the manifold chamber below the partition, thus maintaining the solids conveyed therethrough out of contact with the gas in the manifold chamber, and discharge the solids into confined passageway-defining means wherein the solids are formed into a single discharge stream. Gas is introduced to the manifold chamber below the laterally disposed partition and passes upwardly into the bed through a plurality of gas-conducting tubes extending upwardly through the laterally disposed partition to a level a short distance above the solids withdrawal level or zone. Engagement of the gas with the granular solids is aided by caps associated with each of the tubes, which caps are positioned in the flowing portion of the bed and serve to deflect the downwardly flowing solids and to create ample engaging peripheries for engagement of the granular solids by the gas. Initial engagement of the gas with solids is thus effected approximate the bottom of the moving bed and the accumulation of fines that might possibly hinder or interfere with gas flow into the bed is obviated.

The principles involved in the present invention are set forth in detail below in connection with the description of the drawing in which:

Figure 1 is a vertical view of a vessel containing solid particles in bed form, portions of the vessel being broken away for a better view of the relationship of the internal structure or elements.

Figure 2 is a portion of an enlarged transverse section of the vessel illustrated in Figure 1 taken along the lines 2—2 showing the relationship of the internal structure of the vessel at this level; and Figures 3 and 4 are enlarged partial views showing details of several of the elements shown in Figure 1, the latter illustrating a modification in mounting certain of these elements.

Shown in Figure 1 is a regeneration vessel or kiln indicated generally at 20 which vessel comprises a plurality of contacting or regeneration chambers or zones containing downwardly moving solid particles of hydrocarbon conversion catalyst in bed form, the lowermost of which zones is indicated generally at 21. Fluent solid particles in the size range of from about 50 mesh mesh to about 0.5 inches and comprising coked solid hydrocarbon conversion catalyst, such as granules of acid-activated montmorillonite clay, synthetic silica-alumina gel in pellet or bead form or particles of other solid refractory inorganic compositions known by those skilled in the art to be hydrocarbon cracking catalyst, are introduced to vessel 20 by conduit 22. (As referred to herein coked catalyst is catalyst which has accumulated a hydrocarbonaceous deposit commonly referred to as coke, which deposit has been accumulated concomitantly with the conversion by the catalyst of hydrocarbons to other hydrocarbons different in molecular weight or structure or both.) The particles of coked hydrocarbon conversion catalyst introduced by conduit 22 gravitate downwardly through housing 20 in bed form (i. e., in compact non-turbulent flow) and are contacted under combustion conditions by oxygen-containing gas introduced through conduit 23 to the bed by gas introduction devices (not shown) known to the art, the resulting flue gas being disengaged from the particles and removed by conduit 24.

The conditions of contact and/or the amount of the oxygen-containing gas in the upper regeneration zone or zones in vessel 20 are controlled, as by the use of cooling coils (not shown) and/or by valves (not shown) in conduits 23 and/or 24, so that only a portion of the coke deposit is removed. Additional removal of coke is effected by introducing oxygen-containing gas at the bottom of the vessel in a manner described more fully below, passing this gas through bed 21 in the lowermost regeneration zone under combustion conditions, and removing the resulting flue gas, after disengagement from the particles by disengaging devices known to the art, through conduit 25.

In the illustrated embodiment of the invention, the particles of regenerated catalyst, which may contain a small residual coke deposit, are removed from the lowermost regeneration zone through a plurality of vertical conduits 26, which conduits are spaced substantially uniformly over the horizontal cross sectional area of bed 21, as shown in Figure 2, so as to insure uniform downward flow of bed 21. After traversing the confined passageways defined by vertical conduits 26 as confined compact streams or columns, the granular solids flow through downwardly sloping and centrally converging conduits 27 to a common withdrawal location or device indicated generally at 28. Sloping conduits 27, which are individually affixed, as by welding, to and communicate with the bottoms of conduits 26 (conduits 26 having closed ends other than such communications) are placed at an angle such that the granular solids flow freely therein (i. e., the angles between the axes of the conduits and the horizontal are all greater than the angle of static repose of the granular solids, such as an angle of 45° or greater). Conduits 27 pass through a rounded or generally hemispherical baffle or head 29 and terminate a short distance thereafter. Positioned within head 29, as by welding to the interior surface thereof, are a plurality of nested spaced funnels 31, which funnels terminate in a common horizontal plane within conduit 32. These funnels are designed and arranged so that uniform flow of granular solids in conduits 26 and 27 is effected in the manner described in the patent to Evans referred to above. The particles of freshly regenerated catalyst in conduit 32 pass downwardly therein to a pneumatic lift or mechanical elevator and are thereafter conveyed to the top of a hydrocarbon conversion zone or vessel, or the particles may pass directly to a hydrocarbon conversion zone located immediately below vessel 20.

In accordance with the embodiment of the invention illustrated in Figure 1, a solids supporting member in the form of a flat partition or tube sheet 33, is laterally disposed near the bottom of vessel 20 and in the common horizontal plane formed by the upper ends of conduits 26. Member 33 can be supported in suitable manner from wall 34; as shown, however, it is placed or positioned removably in arcuate plate or head 35, which may be dish-shaped like a welding head. Arcuate head 35, which is preferably rigidly affixed to wall 34, as by welding, is positioned so that it is concave upwardly. The member 33 therefore rests in and is supported by arcuate head 35 in suitable manner as by an annular ring associated therewith and is easily removable therefrom.

Intermediate support for the flat partition 33 is obtained by placing collars or supports 36 adjacent the ends of conduits 26 and rigidly attaching these conduits to arcuate head 35. Conduits 26 thus transmit the load of the bed of granular solids to arcuate head 35, which is better adapted by its curved shape to carry this load than is the flat partition 33. By making slightly oversize holes in partition 33 providing a sliding fit for the entrance of the tops of conduits 26, the feature of removability is retained, without permitting solids to enter the chamber below member 33 except inside conduits 26. As can be seen from Figure 1, member 33 together with the bottom of vessel 20 defines a large chamber which is divided by arcuate head 35 into a lower chamber 37 (defined by arcuate head 35 and the bottom of the vessel), and an upper chamber 38 immediately below partition 33 (defined by members 33 and 35).

Oxygen-containing gas, such as air, partially spent flue gas or the like, is introduced to chamber 37 through conduit 23a and passed around conduits 27 and the lower part of conduits 26. When the gas so introduced is relatively cool, it desirably serves to keep the conduits cool and to cool the granular solids therein by indirect heat exchange. The gas thereafter passes into chamber 38 through holes or orifices 39 in arcuate head 35. Accordingly chamber 37 serves as a gas introduction chamber and chamber 38 as a gas manifolding space.

Gas from gas manifolding space or chamber 38 flows upwardly through short vertical tubes 41, which extend a short distance above partition 33, into the cones of catalyst flowing into the conduits 26.

Spaced above the upper ends of tubes 41 concentrically therewith by bars or supports 42 are solids deflecting devices or caps indicated generally as 43. Various devices, such as cylindrical slotted bubble caps of the type used in distillation columns, or domed or hemispherical caps, may be employed to achieve the desired effect of deflecting the flow of granular solids so that free surfaces of the solids are formed, with a gas filled, solids-free space adjacent the surfaces. The gas from conduits 41 passes into solids-free space 44, through the free surface of the solids (which surface is inclined at the angle of repose of the solids) and thereafter upwardly through the bed 21.

The solids deflecting cap can have the form shown in Figure 3 in which a series of frusto-conical baffles 45, whose diameters decrease in an upward direction and a conical top 46 are spaced apart in overlapping relation as by being affixed to bar or support 47.

In the embodiment of the invention illustrated in Figure 1 the bed of catalyst or other granular contact mass is supported on the substantially flat partition 33 and the solids-deflecting devices 43 are mounted in the partition by the short vertical tubes 41, which as shown, extend to the underside of the partition. In the modified embodiment illustrated in Figure 4, the flat partition 33 is omitted and the vapor tubes 41a are extended to and mounted in the arcuate head 35a, the vapor tubes thus being in direct communication with the plenum or chamber 37. The arcuate head 35a thus serves as a support for the solids bed and as a partition excluding admission of solids into chamber 37 except as confined in the conduits 27 passing through the chamber. In this embodiment, that portion of the kiln volume represented by space 38 in Figure 1, is occupied by a non-moving mass of catalyst; or can be filled, at least in part, with less expensive ceramic or other material.

These disclosed differences in structure do not substantially alter the operation of the invention. In both instances, a gas-tight chamber is provided below the catalyst bed in which chamber the gas introduced is not exposed to contact with granular solids. Initial engagement of the gas with the gravitating bed of solids is effected in the contacting zone whose lowermost limit is approximately at the level of the solids deflecting devices 43. Since these devices are placed only a short distance from the inlets to the vertical conduits 26, the gas does not pass through any substantial body of solids that is not actively in motion. Thus, in the embodiment of Figure 1 there is no significant body of stagnant solids on the partition 33, while in the embodiment of Figure 4 there is a non-moving layer of solids surrounding the conduits 26 and the lower part of vapor tubes 41a, this layer is below the gas-contacting zone. The possibility of creating a zone of localized high resistance to flow due to accumulation of fines in the region is thus avoided.

Engagement of the oxygen-containing gas with the granular solids and withdrawal of the granular solids are effected in accordance with the invention under advantageous distribution conditions and simultaneously in substantially the same portion or volume of the regeneration vessel, while uniform downward flow of the bed of solids is promoted. By the described arrangement there is a considerable saving of required height of the regeneration vessel such as from 2 to 5 feet or more, over known structures wherein the gas engaging means are spaced some distance apart from the level at which the solid particles are being withdrawn from the bed.

While the solids withdrawal level has been shown in the illustrated preferred embodiments, as defined by a flat horizontal plane, it will be understood that minor deviations from such a plane are not excluded so long as there is no substantial interference with (1) desired uniformity of gravitation of the solids across the bed and with (2) uniformity of gas flow into and through the bed. The term "substantially common withdrawal level" is used herein in a sense to include a withdrawal zone of short height.

Although the present invention was described in connection with the introduction of oxygen-containing gas at the bottom of the lowermost regeneration zone, it can be utilized in other ways, as for example, in the bottom of a single stage kiln or to introduce hydrocarbon vapors or purging gas, such as steam, to the bottom of a hydrocarbon conversion zone, or to introduce stripping steam or other gas at the bottom of an adsorption zone (e. g. in the "Hypersorption" type of process). Particular apparatus other than that shown in the drawing can be employed to effect the method of operation described herein. Other adaptations of the invention within the scope of the appended claims will be apparent to those skilled in the art.

Obviously many modifications and variations of the invention as hereinbefore set forth may be made without departing from the spirit and scope thereof and therefore only such limitations should be imposed as are indicated in the appended claims.

I claim as my invention:

1. In a process wherein gas contacts a compact moving bed of granular solids within a contact zone, the improvement which comprises the steps of: withdrawing said solids as a plurality of confined compact moving streams from the bottom of said contact zone at points uniformly distributed over the horizontal cross-sectional area thereof, thereby forming cones of solids flow axially above the points of withdrawal which merge at a higher level within the bottom region of said contact zone to provide thereabove a uniform velocity of solids flow throughout said bed, passing said confined streams of solids through a confined solids-free plenum beneath said contact zone, introducing said gas into said plenum, passing said gas upwardly as a plurality of confined streams from said plenum into the lower region of said contact zone and introducing the same into said bed at points uniformly distributed between said compact moving streams, the initial contact between said gas and said solids being effected within said bed at a level adjacent to the level of solids withdrawal and substantially entirely within the peripheral regions of said cones of solids flow.

2. A process as defined in claim 1 in which said gas in introduced into said moving bed at a plurality of levels along the sides of said cones of solids flow.

3. In a vessel for contracting granular solids with gas, wherein said solids gravitate in the form of a compact moving bed through a contact chamber in countercurrent-flow relation to said gas, the combination of a transverse bed-supporting partition extending across the lower region of said vessel to provide the lowermost boundary of said contact chamber and the uppermost boundary of a solids-free gas distributing chamber formed between said partition and the lower end of the vessel, a plurality of solids withdrawal conduits set in said partition and uniformly distributed throughout the area thereof, said conduits extending downwardly through said distributing chamber, means communicating with the lower ends of said conduits for combining the separate streams of withdrawn solids into a single stream and discharging the latter from said vessel, gas inlet means for said distributing chamber, a plurality of gas conducting tubes set in said partition in the spaces between said conduits, said tubes extending upwardly to a level within said contact chamber above and adjacent to the inlet level of said conduits, and inverted cup-shaped members supported above the upper ends of said tubes and having their solids-deflecting side portions disposed in the peripheral region of the cones of solids flow formed in the regions of said bed axially over the inlets to said conduits, whereby gas discharging from said tubes into the solids-free spaces beneath said cup-shaped members engages said solids substantially entirely within moving portions of said bed.

4. Apparatus as defined in claim 3, in which said side portions of said inverted cup-shaped members are adapted to provide vertically-spaced internal exposed surface areas of said bed, and have louvers providing open communication with said exposed surface areas.

5. Apparatus as defined in claim 3, in which said means for combining the separate streams of withdrawn solids into a single stream comprises a housing adapted to receive the discharge ends of said conduits, a concentrically nested plurality of funnel-shaped members within said housing, each arranged to receive solids from a plurality of said conduits, and a relatively-large solids-discharge conduit extending downwardly from the lower end of said housing and arranged to receive at a common level the entire discharge of solids from said plurality of funnel-shaped members.

References Cited in the file of this patent

UNITED STATES PATENTS

| Number | Name | Date |
| --- | --- | --- |
| 2,393,893 | Evans et al. | Jan. 29, 1946 |
| 2,493,035 | Savage | Jan. 3, 1950 |
| 2,514,371 | Caldwell | July 11, 1950 |
| 2,526,625 | Ardern | Oct. 24, 1950 |
| 2,554,435 | Weber | May 22, 1951 |
| 2,566,896 | Kelly | Sept. 4, 1951 |